United States Patent

[11] 3,631,358

[72] Inventor Kazuo Ayaki
Tokyo-to, Japan

[21] Appl. No. 790,989
[22] Filed Jan. 14, 1969
[45] Patented Dec. 28, 1971
[73] Assignee Nippon Electric Company Limited
Tokyo, Japan
[32] Priorities Jan. 17, 1968
[33] Japan
[31] 43/2513;
Jan. 17, 1968, Japan, No. 43/2514; May 7, 1968, Japan, No. 43/31415; May 7, 1968, Japan, No. 43/31416; May 7, 1968, Japan, No. 43/31417

[54] MULTISTAGE-TYPE MICROWAVE AMPLIFIER
5 Claims, 9 Drawing Figs.

[52] U.S. Cl. .......... 330/53, 330/16, 330/38 M, 330/152
[51] Int. Cl. .......... H03f 3/60
[50] Field of Search .......... 330/53, 16, 38 M; 328/216

[56] References Cited

UNITED STATES PATENTS

| | | | |
|---|---|---|---|
| 3,254,309 | 5/1966 | Miller | 330/34 |
| 2,957,143 | 10/1960 | Enloe | 330/53 |
| 3,093,801 | 6/1963 | Bland | 330/53 |
| 3,131,358 | 4/1964 | Schreiner | 330/53 |
| 3,419,813 | 12/1968 | Kamnitsis | 330/53 |

*Primary Examiner*—John Kominski
*Assistant Examiner*—Darwin R. Hostetter
*Attorney*—Ostrolenk, Faber, Gerb & Soffen

ABSTRACT: A microwave amplifier comprising a plurality of amplifier units connected in cascade fashion. Each of the amplifier units have substantially similar gain-versus-freuqency characteristics, which characteristics are substantially flat over the entire operating frequency range. The units are connected by lines which in the microwave amplifier embodiment may be strip lines having electrical lengths which are selected in accordance with any one of a group of predetermined equations so as to provide a multistage microwave amplifier whose resultant gain-versus-frequency characteristic is likewise substantially flat over the entire operating frequency range.

INVENTOR
KAZUO AYAKI

BY

OSTROLENK, FABER, GERB & SOFFEN
ATTORNEYS

INVENTOR.
KAZUO AYAKI

BY

OSTROLENK, FABER, GERB & SOFFEN
ATTORNEYS

MULTISTAGE-TYPE MICROWAVE AMPLIFIER

The present invention relates to a multistage-type microwave amplifier. When wide-band microwave amplifiers, for example, microwave transistor amplifiers are connected in cascade to obtain a high gain, it is generally understood that the overall characteristic of gain versus frequency does not remain flat even though amplifiers having a flat characteristic of gain versus frequency are connected together. This occurs because the reflecting waves produced as a result mismatching of input impedance and output impedance of each of the unit amplifiers interfere with signal waves. To be brief, considering the case where amplifiers having flat gain-versus-frequency characteristics are connected to form a two-stage cascaded amplifier in order to keep the degree of flatness of the overall frequency characteristic below ±0.2 db., both the output side VSWR in the first stage and the input side VSWR in the latter stage should be of the order of 1.35 or below. When the operative frequency band is narrow, it is easy to obtain a VSWR below 1.35, but it is usually difficult when an operating band width of more than 20 percent, for example, is needed. In the future, I.C. (integrated circuit) technology will be more frequently applied to microwave multistage amplifier circuits. In such cases it is most desirable to provide a circuit design that makes it possible to obtain desired high gain by connecting unit amplifiers of the same design in cascade. However, in order to connect unit amplifiers, whose input and output VSWR are not sufficiently low, in multistage fashion, the effect of reflected waves must be eliminated by inserting uniguides between each of the unit amplifiers. However, when a large number of uniguides are employed, the assembled device becomes large in the size and weight, and becomes expensive.

To solve this problem, a method has been disclosed in PROCEEDINGS OF THE IEEE, Mar., 1963, on pages 237–247, to eliminate the reflected waves by balancing two amplifiers having the characteristics substantially equal using a hybrid circuit. However, this method has the disadvantages of being expensive and requiring twice the normal electric power consumed, in comparison with normal techniques, (i.e. unbalanced type) for obtaining equal gain, because twice the number of amplifier elements are needed. Furthermore, since two hybrid circuits are required for each stage, the circuit becomes complicated, making the fabrication thereof difficult.

The object of the present invention is to eliminate the above-stated disadvantages of the prior art and to provide a multistage amplifier which is simple in construction and easy to manufacture.

The features and objects of this invention and the manner of attaining them will become more apparent and the invention itself will best be understood by reference to the following description of embodiments of the invention taken in conjunction with the accompanying drawings, the description of which follows.

Figure 1:
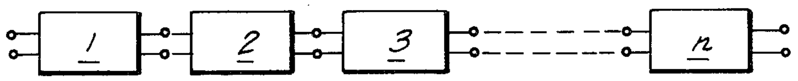
FIG. 1. PRIOR ART
FIG. 1 shows a block diagram of a conventional multistage microwave amplifier in which amplifier units are connected in cascade.

The principle of the present invention will now be explained with reference to FIGS. 1 and 2. As shown in FIG. 1, unit amplifiers are connected in cascade. Representing the scattering matrix of each of the unit amplifiers (hereinafter referred to as the S matrix) by $S_{11}(n)$, $S_{22}(n)$, $S_{12}(n)$, $S_{21}(n)$, the overall gain is expressed by the following equation:

$$G=\frac{S_{21}(1)S_{21}(2)\ \ldots\ S_{21}(n)}{\Delta n} \qquad (1)$$

$$\Delta n\cong 1-S_{22}(1)\,S_{11}(2)-S_{22}(2)\,S_{11}(3)-S_{22}(n-1)\,S_{11}(n) \qquad (2)$$

In equation (2), terms above fourth power of $S_{ij}(n)$ are neglected because they are so small. Even if the gain-to-frequency characteristic of each of unit amplifiers may be flat, ripples are produced in the frequency characteristic of overall gain G, because the absolute value and the phase of each term after the second term in the right side of the equation (2) may change with the frequency, so far as $S_{11}(n)$, $S_{22}(n)$ are finite.

Figure 2:
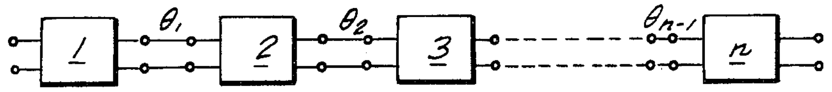
FIG. 2 shows a block diagram of a multistage microwave amplifier utilizing strip lines and which illustrates the principle of the present invention.

In this invention, lines having electrical lengths of $\theta_1$, $\theta_2$, .....$\theta_{n-1}$ , respectively, are inserted between each of the unit amplifiers, as shown in FIG. 2.

For the amplifier shown in FIG. 2, equations (1) and (2) are expressed as follows:

$$G=\frac{S_{21}(1)S_{21}(2)\ \ldots\ S_{21}(n)e^{-(j\theta_1+\theta_2+\ \ldots\ +\theta_{n-1})}}{\Delta n} \qquad (3)$$

$$\Delta n\simeq 1-S_{22}(1)S_{11}(2)e^{-j2\theta_1}-S_{22}(2)S_{11}(3)e^{-j2\theta_2}-\ \ldots\ -S_{22}(n-1)S_{11}(n)e^{-j2\theta_{n-1}} \qquad (4)$$

Assuming that the characteristics of each of unit amplifiers are equal, equation (4) may be transformed as follows:

$$\Delta n\cong 1-S_{22}S_{11}(e^{-j2\theta_1}+e^{-j2\theta_2}\ldots\ldots+e^{j2\theta_{n-1}}) \qquad (5)$$

In this equation (5) the terms above fourth power of $S_{ij}$ are neglected, because they are so small. Now, when the conditions of the following equation (6) are satisfied at a frequency near the center of the band, $$e^{-j2\theta_1}+e^{-j2\theta_2}+e^{-j2\theta_3}+\ldots\ldots+e^{-j2\theta_{n-1}}=0 \qquad (6)$$

then, the term of $S_{22}\,S_{11}$ is eliminated and the value of $\Delta n$ in the equation (5) is as follows:

$$\Delta n\cong 1$$

Thus, the effect of reflecting waves at the input and output sides of each of the unit amplifiers upon the overall characteristic is greatly reduced, and a flat overall gain is obtained. Therefore, if values of $\theta_1$, $\theta_2$, ....., $\theta_{n-1}$ may be taken as satisfying the condition of the equation (6), a resultant characteristic having no ripple may be obtained.

Some embodiments wherein values of $\theta_1$, $\theta_2$, ....., $\theta_{n-1}$ are given variously are explained in following descriptions.

EMBODIMENT I

In this embodiment, lines having electrical lengths of $\theta_1$, $\theta_2$, ...., $\theta_{n-1}$ are inserted between each of unit amplifier as shown in FIG. 2, and they are given by the following equations at the frequency near the center of the operating band:

$$\theta_1=\theta_0,\ \theta_2=\theta_0+\frac{\pi}{n-1},\ \theta_3=\theta_0+2\frac{\pi}{n-1}\ \ldots\ \theta_{n-1}=\theta_0+(n-2)\frac{\pi}{n-1}$$

Or, when wavelength of the lines employed is $\lambda g$, the lengths of each line are given as follows:

$$l_1=l_0,\ l_2=l_0+\frac{1}{2(n-1)}\lambda g,\ l_3=l_0+\frac{2}{2(n-1)}\lambda g,\ \ldots\ l_{n-1}=l_0+\frac{n-2}{2(n-1)}\lambda g.$$

In this case $\theta_0$ and $l_0$ are arbitrary and may be zero. Assuming that characteristics of each of amplifier are equal, $\Delta n$ in the equation (5) becomes as follows.

$$\Delta n \simeq 1 - S_{11}S_{22}(e^{-j2\theta_1} + c^{-j2\theta_2} + \ldots + c^{-j2\theta_{n-1}})$$
$$= 1 - S_{11}S_{22}e^{-j2\theta_0}\left(1 + e^{-j\frac{2\pi}{n-1}} + e^{-j2\cdot\frac{2\pi}{n-1}} \ldots + e^{-j(n-2)\frac{2\pi}{n-1}}\right) = 1$$

Figure 5:
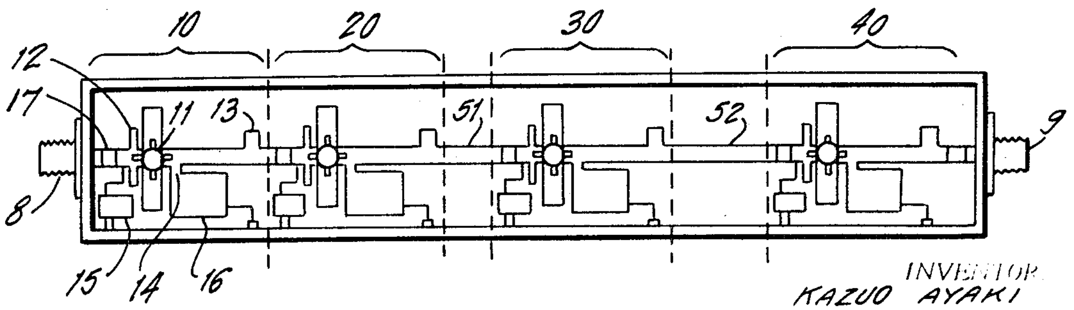
FIGS. 5–9 are plan views showing microwave transistor amplifiers in their physical form arranged as multistage type transistor amplifiers and including strip lines for obtaining flat gain over the frequency bandwidth of interest.

Namely, the equation (6) is satisfied, and as the term of $S_{11}S_{22}$ whose absolute value is largest in terms in $\Delta n$ is eliminated, $\Delta n$ approaches unity and hence the ripples of the overall characteristic of gain vs. frequency becomes extremely small. Then the order of the insertion of $1_1$, $1_2$, $1_3$, ....$1_{n-1}$ between each of amplifier is arbitrary. In FIG. 5 there is shown an embodiment where the principle of this embodiment is applied to a four-stage-type microwave transistor amplifier. A signal is applied to a connector 8 and appears at a connector 9 after amplification. Ten shows the first-stage unit amplifier which has flat characteristic of gain vs. frequency. Eleven is a transistor having a grounded emitter. The base and collector terminals are connected to the strip lines each having a characteristic impedance of 50 ohms. Twelve and 13 are capacitive susceptances, respectively, provided at the input and output circuits, and 14 is an inductive susceptance which is provided at the output side. Fifteen and 16 are high-frequency short circuit capacitors, and 17 is a DC blocking capacitor. Twenty, 30 and 40 are unit amplifiers having characteristics which are substantially equal to that of amplifier 10, and 51 and 52 are lines inserted between amplifiers 20–30 and 30–40 whose lengths are respectively one-sixth of the wavelength and one-third of the wavelength (at the center frequency). In this embodiment $\theta_o$ (or $1_o$) has been selected zero. Each unit amplifier utilized has a flat characteristic of gain vs. frequency. The ripples of gain produced by connecting amplifiers 10–40 is reduced by the inserted lines 51, 52 so that the flat overall frequency characteristic can be obtained.

EMBODIMENT II

Figure 3:
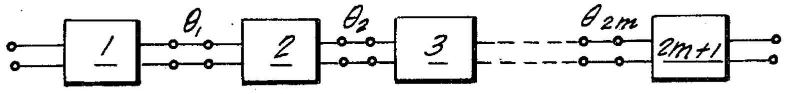
FIG. 3 shows a block diagram view, similar to FIG. 2 for illustrating the principle of the invention when applied to a $(2m+1)$—stage microwave amplifier.

In this embodiment, $n$ equals to $(2m+1)$, and lines having electrical lengths of $\theta_1$, $\theta_2$, ....., $\theta_m$, $\theta_{m+1}$, ... $\theta_{2m}$ are inserted between each of unit amplifier as shown in FIG. 3, and the following equations are satisfied among them at the frequency near the center of the band.

$$\theta_{m+1} = \theta_1 + \frac{\pi}{2}(2m_1 - 1)$$
$$\theta_{m+2} = \theta_2 + \frac{\pi}{2}(2m_2 - 1)$$
$$\theta_{2m} = \theta_m + \frac{\pi}{2}(2m_m - 1) \qquad (7)$$

Alternatively, in terms of wavelength values for the lines $\lambda g$, the lengths of each line are given as follows:

$$1_{m+1} = 1_1 + \frac{\lambda g}{4}(2m - 1)$$
$$1_{m+2} = 1_2 + \frac{\lambda g}{4}(2m_2 - 1)$$
$$\vdots$$
$$1_{2m} = 1_m + \frac{\lambda g}{4}(2m_m - 1)$$

In this case $m_1$, $m_2$ ,.....$m_m$ are integers of one (1) or more and it is desirable that they be equal to (1) in order to make a favorable frequency characteristic. However, each of the values of $\theta_1$, $\theta_2$, ....$\theta_m$ or $1_1$, $1_2$, ....$1_m$ may be arbitrary and may be selected to be zero. Provided that the characteristics of each of amplifiers are equal to $\Delta n$ of the equation (4) becomes as follows: $\Delta_{2m+1} = 1 - S_{11}S_{22}(e^{-j2}1 + e^{-j2\theta}2 + \ldots + e^{-j2\theta}2m)$ (8)

Substituting the equations (7) for the equation (8), the value of $\Delta_{2m+1}$ becomes 1. Namely the equations (7) satisfy the equation (6), and as the term of $S_{11}S_{22}$ whose absolute value is largest in terms in $\Delta_{2m+1}$ is eliminated., $\Delta_{2m+1}$ approaches the value of unity and, therefore, ripple of the overall characteristic of gain vs. frequency is reduced extremely. Moreover, there remains the freedom that it is possible to select the values of $\theta_1$, $\theta_2$, ....$\theta_m$ arbitrarily, so that by selecting these values properly it is also possible to make the change of $|\Delta_{2m+1},|$ due to frequency, minimum over the bandwidth. Whereas the order of inserting each line between amplifiers may be arbitrary, it is desirable to arrange $1_1$ and $1_{m+1}$, $1_2$ and $1_{m+2}$, ... and $1m$ and $1_{2m}$ in succession respectively.

Figure 6:
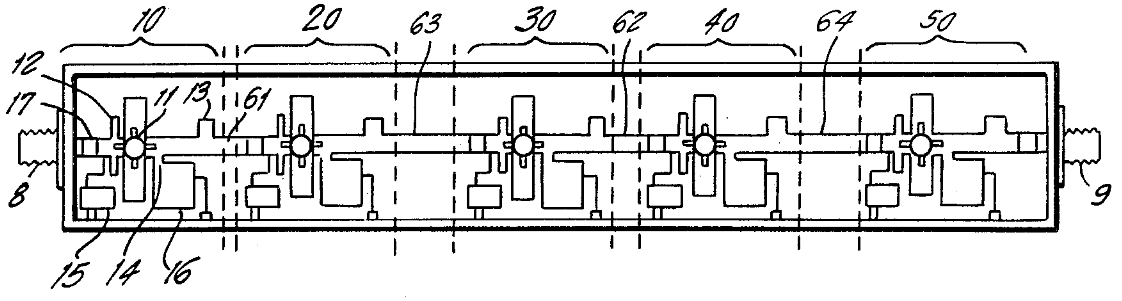

In FIG. 6 there is shown an embodiment where the principle of this embodiment is applied to a five-stage-type microwave transistor amplifier. Ten is a first-stage unit amplifier having a flat characteristic of gain vs. frequency. Eleven is a transistor with its emitter grounded and its base and its collector terminals connected to strip lines each having a characteristic impedance of 50 ohms. Twelve and 13 are capacitive susceptances which are respectively provided at the input and output circuits, and 14 is an inductive susceptance which is provided at the output side. Fifteen and 16 are high-frequency short circuit capacitors, and 17 is a DC blocking capacitor. 20, 30, 40 and 50 are unit amplifiers having characteristics which are substantially equal to that of 10. Sixty-one and 62 are lines which are inserted respectively between the first and second stages and between the third and fourth stages and these lengths $1_1$ and $1_2$ selected arbitrarily. Sixty-three and 64 are lines which are inserted respectively between the second and third stages and between the fourth and fifth stages and these lengths are $1_1+\lambda g/4$ and $1_2+\lambda g/4$. In this case $\lambda g$ denotes the wavelength on lines at the frequency near the center of the band. A signal is applied to a connector 8 and appears at a connector 9 after amplification. In this cascaded amplifier, the ripple of the gain characteristic produced by connecting unit amplifiers of flat characteristic of gain vs. frequency is reduced by the inserted lines 61, 62, 63 and 64, so that the flat overall frequency characteristic can be obtained.

EMBODIMENT III

In this embodiment, $n$ is chosen as being equal to $(2m+1)$, and lines having electrical lengths of $\theta_1$, $\theta_2$, ...$\theta_{2m}$, respectively, are inserted between each of the unit amplifiers, as shown in FIG. 3 and $\theta_1$, $\theta_2$, ...$\theta_{2m}$ are given as meeting the equations:

$$\theta_1 = \theta_0 + \theta'_1,\ \theta_2 = \theta_0 + \theta'_2 \ldots \theta_m = \theta_0 + \theta'_m$$
$$\theta_{m+1} = \theta_0 + \pi - \theta'_1,\ \theta_{m+2} = \theta_0 + \pi - \theta'_2$$
$$\theta_{2m} = \theta_0 + \pi - \theta'_m \qquad (9)$$

and $\theta'_1$, $\theta'_2$ ....$\theta'_m$ are assumed to satisfy the following equation at a frequency near the center of the amplifying band ($\theta_o$ is an optional number ):

$$\cos 2\theta'_1 + \cos 2\theta'_2 + \ldots + \cos 2\theta'_m = 0 \qquad (10)$$

As the characteristics of each of unit amplifiers are equal, the equation (4) may be transformed as follows:

$$\Delta 252m+1 \cong 1 - S_{11}S_2(e^{-j2\theta}1 + e^{-j2\theta}2 + \ldots + e^{-j2\theta}2m) \qquad (11)$$

By substituting the equation (9) for the equation (11), we have $\Delta 2m+1$ as follows:

$$\Delta 2m+1 \cong 1 - S_{11}S_{22}e^{-j2}{}_p \times 2(\cos 2\theta'_1 + \cos 2\theta'_2 + \ldots \ldots + \cos 2\theta'_m)$$

Therefore, as the conditions of the equation (10) are satisfied at a frequency near the center of the band, $$\Delta\, 2m+1 \cong 1$$

near that frequency. That is, the equation (6) is satisfied and effect of reflecting waves at the input and output sides of each of the unit amplifiers upon the overall gain versus frequency characteristic is greatly reduced, and a flat overall gain is obtained.

Considering now a seven-stage-type amplifier as an example of this embodiment. In this case the equation (10) may be expressed as follows:

$$\cos 2\theta'_1 + \cos 2\theta'_2 + \cos 2\theta'_3 = 0 \qquad (12)$$

$\theta_1'$, $\theta_2'$, $\theta_3'$, which satisfy the equation (12) take the following values:

$$2\theta'_1=(\pi/12)$$
$$2\theta'_2=\cos^{-1}(1-\cos(\pi/12)^{\circ}1.536$$
$$2\theta'_3=\pi \qquad (13)$$

The values of $\theta_1$, $\theta_2$ ....$\theta_{2m}$ are given from the equations (13) and (9) as follows:

$$\theta_1=\frac{\pi}{24}$$
$$\theta_2=\frac{1}{2}\cos^{-1}\left(1-\cos\frac{\pi}{L2}\right)\doteqdot 0.768$$
$$\theta_3=\frac{\pi}{2}$$
$$\theta_4=\frac{23}{24}\pi$$
$$\theta_5=\pi-\frac{1}{2}\cos^{-1}\left(1-\cos\frac{\pi}{12}\right)\doteqdot 2,373$$
$$\theta_6=\frac{\pi}{2} \qquad (14)$$

In this case, $\theta_o$ is selected as zero.

When the wavelength of the lines is λg., lengths of each line are given as follows:

$$1_1=\frac{1}{48}\lambda g,\ 1_2=\frac{0.768}{2\pi}\lambda g,\ 1_3=\frac{\lambda g}{4},$$
$$1_4=\frac{23}{48}\lambda g,\ 1_9=\frac{2.373}{2\pi}\lambda L,\ 1_6=\frac{\lambda g}{4} \qquad (15)$$

Figure 7:
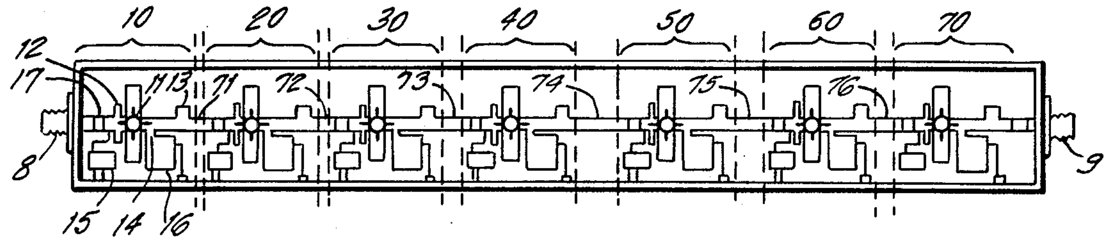

In FIG. 7 there is shown an embodiment where the present invention is employed in a seven-stage-type microwave transistor amplifier. The numeral 10 shows the first-stage unit amplifier, which has a flat gain vs. frequency characteristic. 11 is a transistor having a grounded emitter and base and collector terminals connected to strip lines each having a characteristic impedance of 50 ohms. 12 and 13 are capacitances provided in the input and output circuits, respectively, 14 is an inductive susceptance placed in the output side. 15 and 16 are high-frequency short circuit capacitors, 17 is a DC blocking capacitor. 20, 30, 40, 50, 60 and 70 are unit amplifiers having characteristics which are substantially equal to that of 10. Between each of the unit amplifiers, lines 71, 72, 73, 74, 75 and 76 each having lengths of $1_1$, $1_2$, $1_3$, $1_4$, $1_5$, $1_6$ are inserted respectively. The values of $1_1$, $1_2$, .....$1_6$ are given by the equation (15). The signal is applied to connector 8, and is taken out of the connector 9 after being amplified. In this amplifier, since the ripples of the frequency characteristic produced by connecting the unit amplifier having flat gain frequency characteristic are reduced by the reason of the structure mentioned above, a flat overall gain vs. frequency characteristic is obtained.

EMBODIMENT IV

Figure 4:
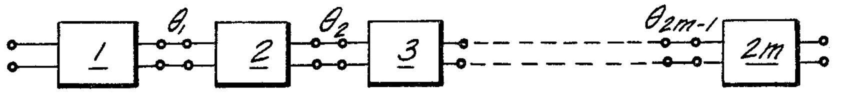
FIG. 4 shows a block diagram view similar to FIGS. 2 and 3 for illustrating the principle of the invention when applied to a 2m-stage microwave amplifier.

In this embodiment, *n* equals to 2*m* and lines having electrical lengths of $\theta_1$, $\theta_2$, ....$\theta_{2m-1}$, respectively, are inserted between each of the unit amplifiers, as shown in FIG. 4. Now, $\theta_1$, $\theta_2$.... $\theta_{2m-1}$ are assumed to be those given by the equations:

$$\left.\begin{array}{l}\theta_1=\theta_o',\ \theta_2=\theta_o+\theta_2',\ \theta_3=\theta_o+\theta_3'\ ...\theta_m=\theta_o+\theta_m' \\ \theta_{m+1}=\theta_o+\pi-\theta_2',\ \theta_{m+2}=\theta_o+\pi-\theta_3'\ ..... \\ ....\theta_{2m-1}=\theta_o+\pi-\theta_m\end{array}\right\}\ (16)$$

and $\theta_2'$, $\theta_3'$ .....$\theta_m'$ are assumed to satisfy the following equation at a frequency near the center of the amplifying band ($\theta_o$ is an optional value or equal to zero):

$$\cos 2\theta_2'+\cos 2\theta_3'+\ ...\ +\cos 2\theta_m'=-½ \qquad (17)$$

As the characteristics of each of unit amplifiers are equal, the equation (4) may be transformed as follows:

$$\Delta\ 2m\cong 1-S_{11}S_{22}(e^{-j2\theta}1+e^{-j2\theta}2+\ ....+e^{-j2\theta}2m-1) \qquad (18)$$

By substituting the equation (16) for the equation (18), Δ 2*m* is given as follows:

$$\Delta 2m\cong 1-S_{11}S_{22}\times e^{-j2}\ o\times 2(½$$
$$+\cos 2\theta_2'+\cos\theta_3'.....+\cos 2\theta_m') \qquad (19)$$

Therefore, as the conditions of the equation (17) are satisfied at a frequency near the center of the band, $$\Delta 2m\cong 1$$

near that frequency. That is, the equation (6) is satisfied, the effect of reflecting waves at the input and output sides of each of the unit amplifiers upon the overall characteristics is greatly reduced, and a favorable overall gain vs. frequency characteristic is obtained.

Considering now a six-stage-type amplifier as an example of this embodiment. In this case the equation (17) may be expressed as follows:

$$\cos 2\theta_2'+\cos 2\theta_3'=-½ \qquad (20)$$

$\theta_2'$, $\theta_3'$, which satisfy the equation (20), take the following values:

$$\theta_2'=\theta_3'=½\cos^{-1}(-¼)\cong 0.912 \qquad (21)$$

Valves of $\theta_1$, $\theta_2$, ...$\theta_5$ are given from the equation (21) and (16) as follows:

$$\theta_1=0$$
$$\theta_2=\theta_3=^{1/2}\cos^{-1}(-¼)\approx 0.912$$
$$\theta_4=\theta_5=\pi-½\cos^{-1}(-¼)\approx 2.229 \qquad (22)$$

in this case, $\theta_o$ is selected as zero.

When the wavelength of the lines is λg, the lengths of each line are given by the follow $$1_1=0$$
$$1_2=1_3=\frac{0.912}{2\pi}\lambda g$$
$$1_4=1_5=\frac{2.229}{2\pi}\lambda g \qquad (23)$$

Figure 8:
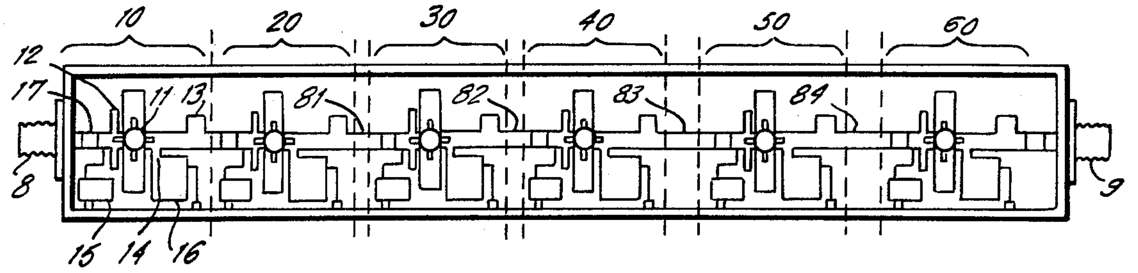

FIG. 8 shows a practical embodiment where this technique is applied to a six-stage-type microwave transistor amplifier. The numeral 10 shows the first-stage unit amplifier, which has a flat gain vs. frequency characteristic. 11 is a transistor, its emitter is grounded, its base and its collector terminals are connected to the strip line having 50 ohms. 12 and 13 are capacitive susceptances provided in the input and output circuits, respectively, 14 is an inductive suspectance placed in the output side. 15 and 16 are high-frequency short circuit capacitors, 17 is a DC blocking capacitor. 20, 30, 40, 50 and 60 are unit amplifiers having characteristics which are substantially equal to that of 10. 10 and 20 are each connected directly ($1_1$=0), but between 20 and 30, 30 and 40, 40 and 50, 50 and 60, lines 81, 82, 83, and 84 each having a length of $1_2$, $1_3$, $1_4$, $1_5$ are inserted, respectively. Values of $1_2$, $1_3$, $1_4$ and $1_5$ are given by the equation (23). The signal is applied on the connector 8 and is taken out of the connector 9 after being amplified. In this amplifier, since the ripple of the frequency characteristic produced by connecting the unit amplifier having a flat gain vs. frequency characteristic is reduced by the reason mentioned above, a flat overall frequency characteristic is obtained.

EMBODIMENT V

In this embodiment, lines having electrical length of $\theta_1$, $\theta_2$, . . ., $\theta_{n-1}$, respectively are inserted between each of the unit amplifiers, as shown in FIG. 2, and $\theta_1$, $\theta_2$ . . .$\theta_{n-1}$ are those which satisfy the following equations at frequencies near the center of the amplifying band:

$$e^{j-2\theta_1}+e^{-j2\theta_2}+\ \cdots\ +e^{-j2\theta_k}=0$$
$$e^{-j2\theta_{k1}}+e^{-j2\theta_{k+2}}+\ \cdots\ +e^{-j2\theta_{n=1}}=0$$
$$2\leqq K\leqq n-3 \qquad (24)$$

Therefore the equation (6) is satisfied, and the value of Δ*n* in the equation (5) is as follows:

$$\Delta n\cong 1$$

That is, effect of reflecting waves at the input and output sides of each of the unit amplifiers upon the overall characteristic is really reduced, and a flat overall gain is obtained.

Considering now a six-stage-type amplifier as an example of this embodiment; in the equation (24), by putting *k*= 2, the equation may be expressed as follows:

$$e^{-j2\theta_1}+e^{-j2\theta_2}=0$$

$$e^{-j2\theta_3}+e^{-j2\theta_4}+e^{-j2\theta_5}=0 \qquad (25)$$

Inserting lines having lengths of $l_1$, $l_2$, $l_3$, $l_4$ and $l_5$ between each of the unit amplifiers, and giving the values thereof as follows:

$$l_1=0,\ l_2=\frac{\lambda g}{4},$$

$$l_3=0,\ l_4=\frac{\lambda g}{6},\ l_5=\frac{\lambda g}{3}$$

Where $\lambda g$ shows a wavelength on the line at the frequency near the center of the amplifying band. At the frequency, $\theta_1 \approx \theta_5$ may be expressed as follows:

$$2\theta_1=0,\ 2\theta_2=\pi$$

$$2\theta_3=0,\ 2\theta_4=\frac{2}{3}\pi,\ 2\theta_5=\frac{4\pi}{3}$$

Accordingly, it is evident that the conditions of the equation (25) are satisfied.

Figure 9:
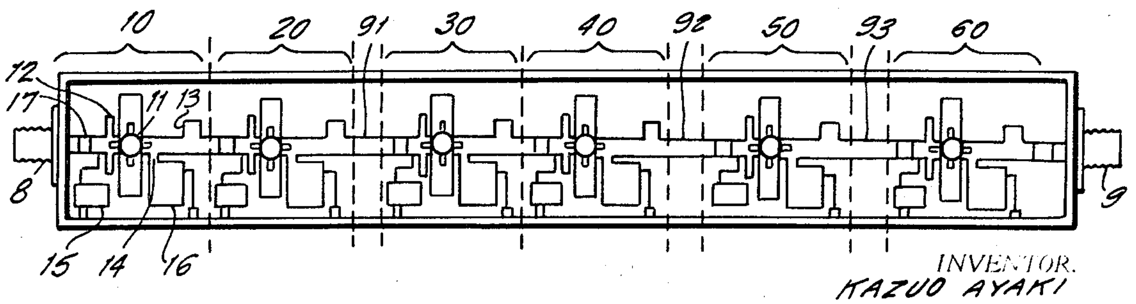

In FIG. 9, there is shown an embodiment where this embodiment is applied on a six-stage-type microwave transistor amplifier. The numeral 10 shows the first stage unit amplifier which has a flat gain-frequency characteristic. 11 is a transistor, its emitter is grounded, its base and its collector terminals are connected to the strip line having characteristic impedance of 50 ohms. 12 and 13 are capacitive susceptances provided in the input and output circuits, respectively. 14 is an inductive susceptance placed in the output side. 15 and 16 are high-frequency short circuit capacitors. 17 is a DC blocking capacitor. 20, 30, 40, 50 and 60 are unit amplifiers having characteristics which are substantially equal to that of 10. 10 and 20, 30 and 40 are each connected directly ($l_1$=0, $l_3$=0), but between 20 and 30, 40 and 50, 50 and 60, lines 91, 92 and 93 are inserted, respectively. The lengths thereof are $\lambda g/4$, $\lambda g/6$, and $\lambda g/3$, where $\lambda g$ represents the wavelength on the line at the frequency near the center of the band. The signal is applied on the connector 8 and is taken out of the connector 9 after being amplified. In this amplifier, since the ripple on the gain produced by connecting the unit amplifier having a flat gain vs. frequency characteristic is reduced by the reason mentioned above, a flat overall frequency characteristic is obtained.

Embodiments have been shown in above descriptions where the present invention is applied on a microwave transistor amplifier, but it is to be understood the technique can also be applied other cascaded amplifier circuits are to be cascaded.

Although there is shown a case, in the above description, where simple transmission lines are used for the lines to be inserted, it is also possible to use circuit comprising capacitances and/or inductances.

Furthermore, it is also possible first to assemble a unit amplifier composed of plural stages of amplifiers, and further to cascade the unit amplifiers according to the principle of the present invention.

What is claimed is:

1. A multistage microwave amplifier comprising $n$ transistor amplifier stages each having substantially similar flat gain versus frequency characteristics over a predetermined portion of the microwave frequency range, wherein $n$ is an integer equal to or greater than 3;

$n$—1 strip lines each having a different predetermined electrical length and each being inserted between the output and input terminals of adjacent amplifier stages;

said electrical lengths being selected to provide a substantially flat resultant gain versus frequency characteristic for said multistage amplifier over said predetermined portion of the microwave frequency range wherein the electrical lengths are totally independent of the input and output impedance values of the individual amplifier stages.

2. A multistage high-frequency amplifier structure comprising $n$ transistor amplifier stages each having substantially equal gain versus frequency characteristics over a predetermined frequency range, wherein $n$ is an integer equal to or greater than 3;

$n$—1 strip lines each having predetermined electrical lengths and each being inserted between the output and input terminals of adjacent amplifier stages;

said electrical lengths being selected to provide a substantially flat resultant gain versus frequency characteristic over said frequency range for said multistage amplifier.

3. A multiple-stage-type microwave amplifier comprising:

$n$ transistor amplifier units each having substantially equal gain versus frequency characteristics over a predetermined frequency range, wherein $n$ is any integer equal to or greater than 3;

($n$—1) transmission lines, each having electrical lengths whose phase delays are given by $\theta_1$, $\theta_2$, . . . $\theta_{n-1}$ wherein each line may have an electrical length equal to or greater than zero so as to satisfy the equation:

$$e—J2\theta_1+e^{—J2}\ \theta_2+\ldots+j2\theta_n\text{-}1=0$$

at a frequency near the center of the frequency band being amplified, said lines being inserted one by one between each of the $n$ unit amplifiers to provide a multistage amplifier having a substantially flat gain versus frequency characteristic.

4. A multistage-type microwave amplifier comprising $n$ unit transistor amplifiers having substantially equal gain vs. frequency characteristics, where $n$ is any integer equal to or greater than 3;

($n$—1) transmission lines having electrical lengths whose phase delays are given by $$\theta_0+\frac{\pi}{n-1},\ \theta_0+2.\frac{\pi}{n-1},\ \theta_0+3.\frac{\pi}{n-1},\ \cdots\ \theta_0+(n-3).\frac{\pi}{n-1},\ \theta_0+(n-2).\frac{\pi}{n-1}$$

(where $\theta_0$ is equal to or greater than zero) at frequency near the center of amplification band being inserted respectively one by one between the inputs and outputs of each of said unit amplifiers to provide a multistage amplifier having a substantially flat gain versus frequency characteristic.

5. A multistage microwave amplifier structure comprising $n$ microwave transistor amplifier stages each having substantially flat gain versus frequency characteristics over a predetermined frequency range and each being comprises of at least one semiconductor device, wherein $n$ is an integer equal to or greater than 3;

($n$—1) transmission lines each having different predetermined electrical lengths and each being inserted between the output and input terminals of adjacent amplifier stages;

said electrical lengths being selected to provide a substantially flat resultant gain versus frequency characteristic for said multistage microwave amplifier over said frequency range;

said lines each being microwave strip lines.